US008910367B2

(12) United States Patent
Adams, Jr.

(10) Patent No.: US 8,910,367 B2
(45) Date of Patent: Dec. 16, 2014

(54) SLIP BRACKET CONNECTOR FOR RIGID MEMBERS

(71) Applicant: BTI, Inc., Tempe, AZ (US)

(72) Inventor: Vaughn P. Adams, Jr., Tempe, AZ (US)

(73) Assignee: BTI, Inc., Tempe, AZ (US)

( * ) Notice: Subject to any disclaimer, the term of this patent is extended or adjusted under 35 U.S.C. 154(b) by 0 days.

(21) Appl. No.: 14/204,246

(22) Filed: Mar. 11, 2014

(65) Prior Publication Data

US 2014/0189997 A1    Jul. 10, 2014

Related U.S. Application Data

(63) Continuation of application No. 13/628,408, filed on Sep. 27, 2012.

(51) Int. Cl.
| | |
|---|---|
| *F16B 7/00* | (2006.01) |
| *F16B 7/04* | (2006.01) |
| *B23P 11/00* | (2006.01) |

(52) U.S. Cl.
CPC . *F16B 7/04* (2013.01); *B23P 11/00* (2013.01); *F16B 7/00* (2013.01)
USPC ............ 29/525.02; 29/525.03; 403/233

(58) Field of Classification Search
CPC ............................................. F16B 7/04
USPC ............ 29/525.02, 525.03; 403/232.1, 233; 248/65, 71, 300; 411/461; 405/221
See application file for complete search history.

(56) References Cited

U.S. PATENT DOCUMENTS

| | | | | | |
|---|---|---|---|---|---|
| 4,685,576 | A | * | 8/1987 | Hobson | 211/189 |
| 5,150,982 | A | * | 9/1992 | Gilb | 403/232.1 |
| 5,186,571 | A | * | 2/1993 | Hentzschel | 403/231 |
| 5,771,646 | A | * | 6/1998 | DeSouza | 52/263 |
| 5,961,242 | A | * | 10/1999 | Leone | 403/234 |
| 6,446,409 | B1 | * | 9/2002 | Emerson | 52/712 |
| 7,427,055 | B2 | * | 9/2008 | Platt | 256/65.06 |
| 8,429,805 | B1 | * | 4/2013 | Adkins | 29/525.14 |
| 2008/0173856 | A1 | * | 7/2008 | Payne | 256/47 |

* cited by examiner

*Primary Examiner* — David Bryant
*Assistant Examiner* — Steven A Maynard (57) ABSTRACT

A one-piece rigid connector allows a nominal construction wood member to slip axially while fixed at its distal end, to accommodate the naturally occurring shrinkage of lumber. The connector surrounds the wood member and attaches to a second wood member to secure the members together. The connector may be slightly larger radially than the first member to accommodate natural movement. In one embodiment, the connector is made of a light gauge sheet metal and attaches a vertical baluster to the horizontal lower deck rail of an elevated wood deck guard rail system. The connector secures the baluster horizontally, but allows the baluster to move vertically to accommodate expansion or contraction of the baluster after construction. The distal end of the baluster is secured using conventional wood screw attachment. The connector includes tabs on each side to allow fastening of the connector to the lower deck rail using conventional wood screws.

8 Claims, 7 Drawing Sheets

SLIP BRACKET CONNECTOR FOR RIGID MEMBERS

FIELD OF INVENTION

This invention relates to rigid connectors for joining two intersecting rigid members. This invention relates particularly to a rigid one-piece connector that perpendicularly joins two rigid wood members while allowing slip movement in one of the members.

BACKGROUND

Wood beams, posts, joists, balusters, and the like, referred to collectively herein as "members," naturally shrink and expand due to the composition of the wood. A wood member can decrease and increase in length due to shrinkage and expansion in the direction of the wood grain. Frequent fluctuations of 3% are common, and fluctuations of as much as 18% may occur depending on the moisture content of the wood and the surrounding environment. Radial dimension changes also occur, although typically less drastically than length fluctuations. Despite the widespread knowledge of the natural dimensional fluctuations of wood members, conventional construction techniques largely ignore them, often to significant structural detriment.

In particular, it is often necessary to attach two wood members perpendicular to each other. Typically, the members are attached with a fastener, such as a nail or screw. Other known attachment devices include metal plate connectors that conform to the shape of the joint between the members. These metal plates are attached with fasteners to both members to create a "strong" or "rigid tie" that does not account for the dimensional fluctuations in the members. Once construction is complete, over time these fluctuations impart considerable tension forces on the members, the attachment devices, and related attached structural components. The tension forces may loosen the attachments across the joint, damage the wood, and otherwise warp the original shape and support capabilities of the constructed members.

While there are indeed requirements that some connections be rigid, in many instances the anticipated shrinkage of the wood member must be a consideration within the design and construction of wooden member connections. In particular, wood balustrades, as typically seen on balconies and decks, would benefit from a wood member connector that addresses the natural dimensional fluctuations. A balustrade is composed of several vertically-oriented balusters attached to top and bottom rails and spaced evenly apart so as to act as a guard rail or other barrier. Typically, the balusters are attached by nails or screws driven through each baluster at the upper and lower ends. The balusters then strain against the fasteners due to the dimensional fluctuations. Eventually, the fasteners begin to pull out, the wood splinters, or the contraction pulls the rails out of alignment, leading to significant safety hazards. A connector for balusters that accommodates the dimensional fluctuations is needed.

Therefore, it is an object of this invention to provide a device to attach two wood members to each other while accounting for the expected natural dimensional fluctuations of one or both members. It is a further object that the device provide a perpendicular attachment of the wood members. It is another object of the invention to provide a method of constructing structures with wood members that accounts for dimensional fluctuations in some or all of the wood members.

SUMMARY OF THE INVENTION

A bracket connector attaches a first wood member to a second wood member while allowing for a slip movement by the first member to accommodate dimensional fluctuations in the first member while it is securely fixed at one end. The connector fits around the perimeter of the first member, leaving a clearance gap that is thin enough to secure the first member laterally but wide enough to allow for natural radial and longitudinal expansion of the first member. The connector attaches to the second member with one or more nails, screws, or other fasteners. The connector does not securely attach to the first member, which allows for the slip movement along the first member's longitudinal axis. The several illustrated embodiments show the bracket connector as a u-shaped thin metal bracket sized to fit around a deck baluster, a ceiling joist, or a square support post, but applications to other wood members are contemplated.

DETAILED DESCRIPTION OF THE INVENTION

Referring to FIGS. 1-5, there is illustrated a first embodiment of the present invention designated generally as 10 which is a one-piece bracket connector used to attach a first wood member to a second wood member while allowing the first wood member to fluctuate dimensionally according to the environment and the natural properties of the wood. A front portion 11 is attached to, and preferably integral with, a left portion 12 and a right portion 13 to form a three-sided brace. Preferably, the left and right portions 12, 13 are perpendicular to the front portion 11 and parallel to each other so that the brace is u-shaped. See FIG. 2. Alternatively, one or both of the left and right portions 12, 13 may intersect the front portion 11 at an acute or obtuse angle to accommodate non-square, non-rectangular first wood members, such as trapezoidal beams. The left and right portions 12, 13 may alternatively intersect each other to form a triangular beam having an apex at the intersection of the portions 12, 13 instead of a front portion 11, Left and right tabs 14, 15 are attached to, and preferably integral with, the left and right portions 12, 13, respectively, at the rear edge of each portion 12, 13. The tabs 14, 15 project laterally from their respective portions 12, 13 substantially parallel to the front portion 11. Preferably, the tabs 14, 15 are narrower than the left and right portions 12, 13 and are centered along the rear edge of the portions 12, 13. The tabs 14, 15 are preferably coplanar so that the tabs 14, 15 together make flush contact with the planar attachment surface of the second wood member as described below. One or more apertures 16 are disposed through each tab 14, 15. The apertures 16 each receive a fastener, preferably a screw, for securely attaching the device 10 to the second wood member. In the preferred embodiment, the apertures 16 in each tab 14, 15 are offset from each other, most preferably by placing one aperture 16 at the top of its tab and the other aperture at the bottom of its tab. The offset positioning minimizes the potential for the second wood member to split along its grain when the fasteners are driven into it.

Figure 1:
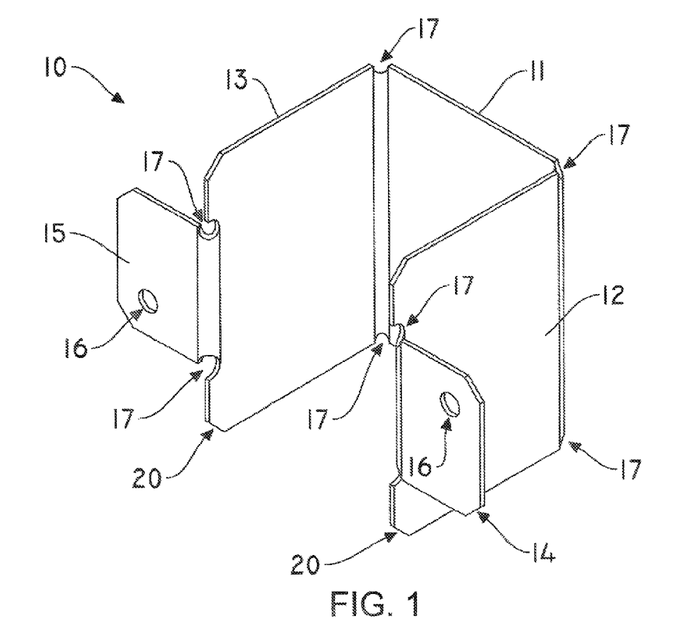
FIG. 1 is a top rear left isometric view of a first embodiment of the present invention.
Figure 2:
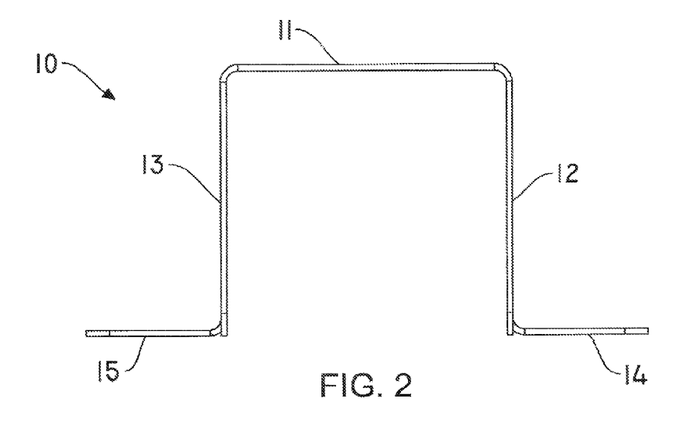
FIG. 2 is a top view of the first embodiment of the present invention.
Figure 3:
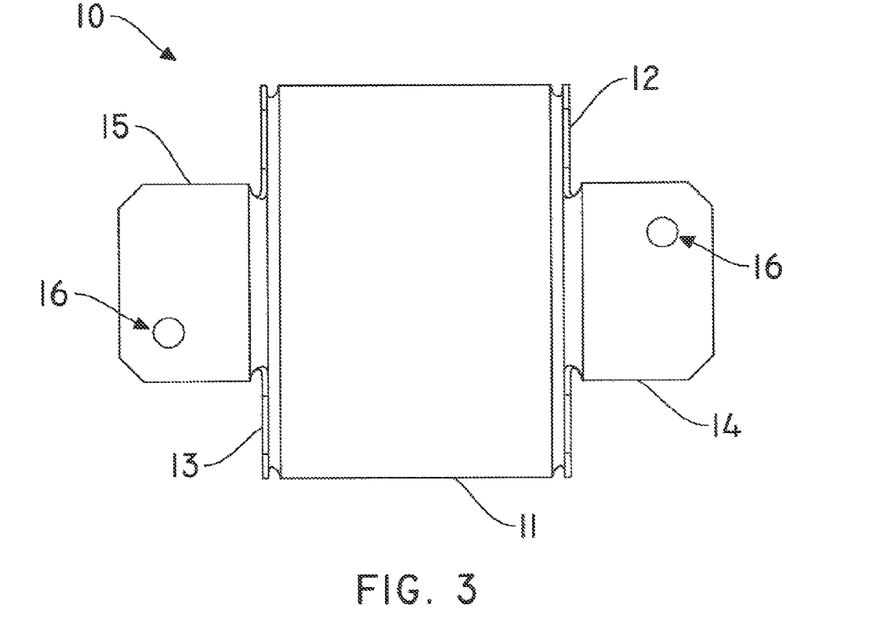
FIG. 3 is a front view of the first embodiment of the present invention.
Figure 4:
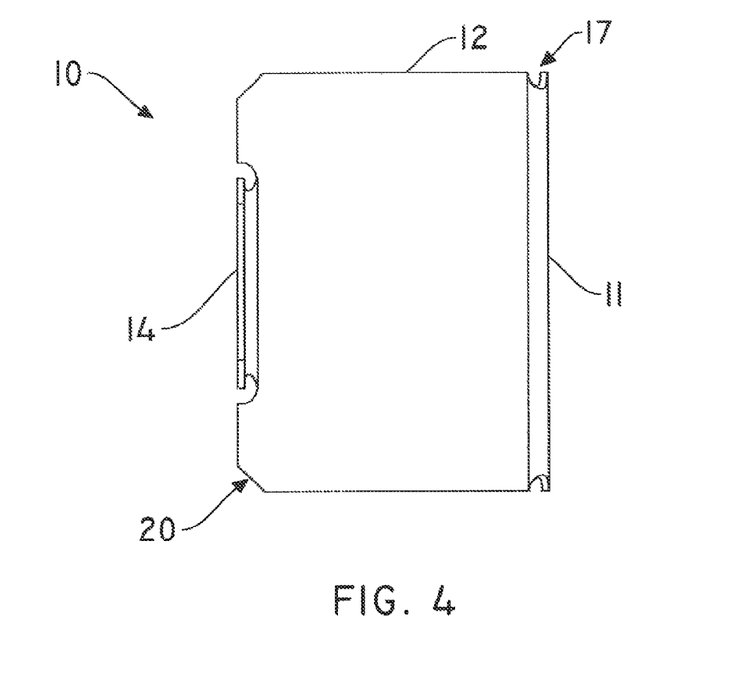
FIG. 4 is a right side view of the first embodiment of the present invention.
Figure 5:
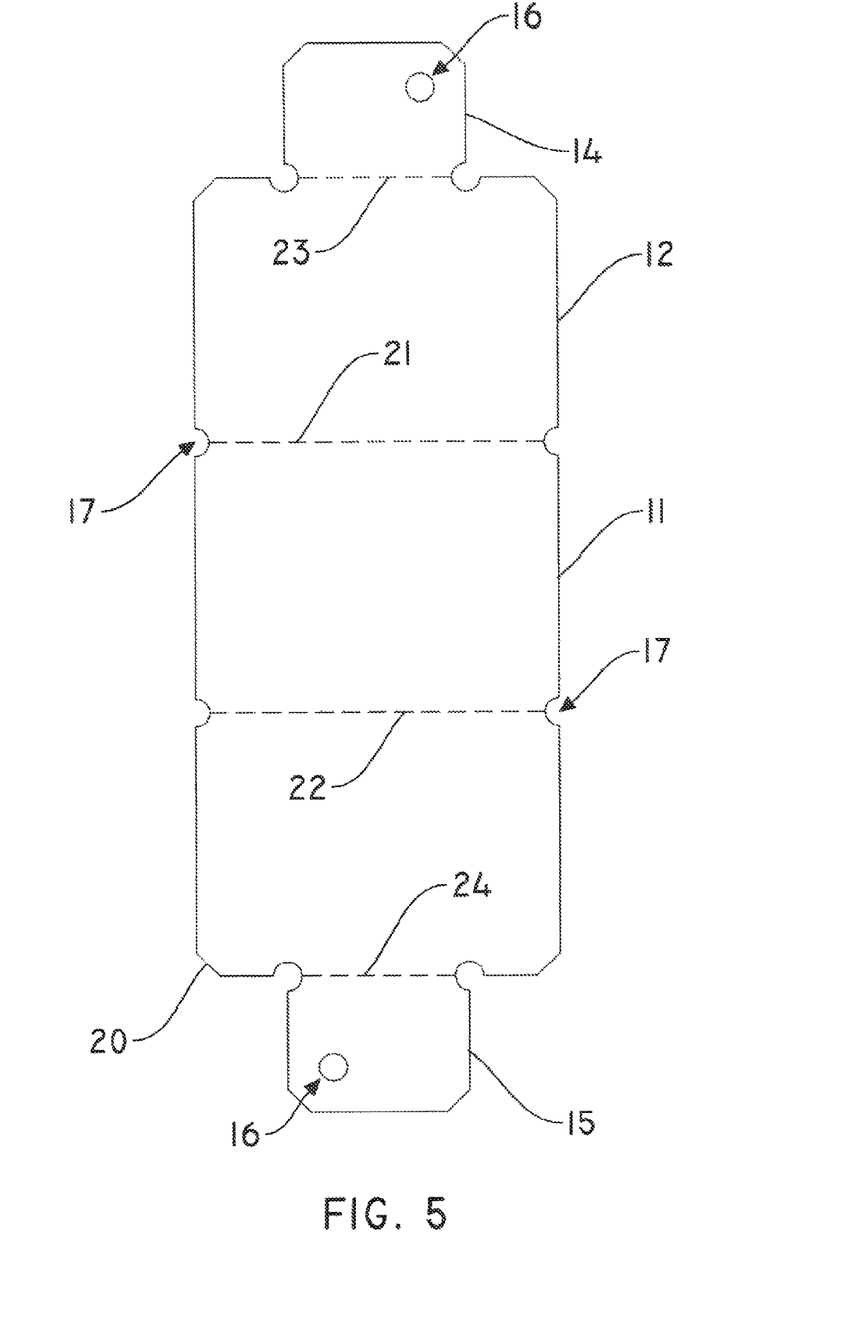
FIG. 5 is a diagram of a stamping pattern for fabricating the first embodiment of the present invention.

The device 10 is preferably formed from a single piece of sheet metal, rendering each of the device 10 components substantially planar. The illustrated first embodiment of the device 10 may be stamped out of the sheet metal as shown in FIG. 5. Stress relief punches 17 may be formed at each juncture of the components to facilitate bending of the sheet into the proper device 10 configuration without imparting undue stress on the components along the bend lines. Preferably, the stamped metal is folded at 90 degree angles up out of the page at first and second up-fold lines 21, 22, and folded at 90 degree angles down into the page at first and second down-fold lines 23, 24. Each bend requires a material bend allowance to maintain proper final dimensions after bending of the part is accomplished. Rear corners 20 of the left and right portions 12, 13 may be linearly cut or rounded to prevent damage or injury from the sharp corner. Alternatively, the device 10 may be die stamped, cast, molded, or extruded, and may be a structural composite material instead of metal. The preferred metal is galvanized steel, which may be untreated or treated with one or more coatings, such as a colored powder coating.

Figure 6:
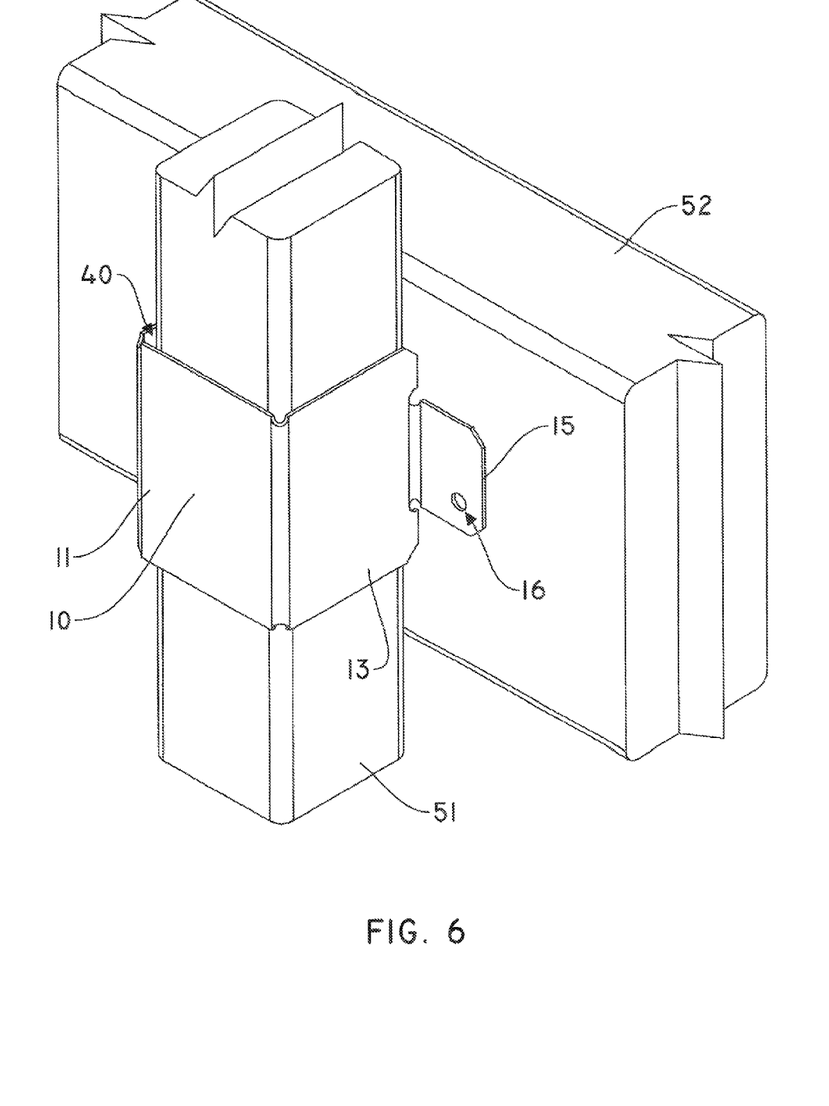
FIG. 6 is a top front right isometric view of the first embodiment of the present invention placed over a baluster.
Figures 7, 8:
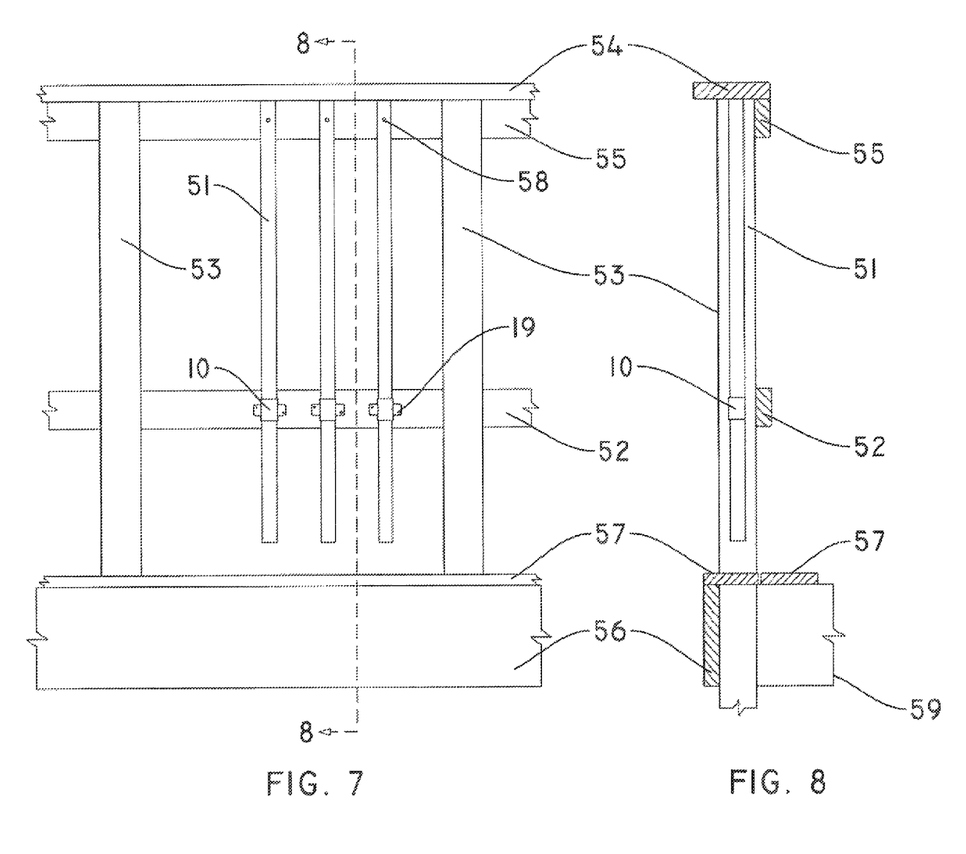
FIG. 7 is a front view of a portion of a balustrade constructed using the first embodiment of the present invention.
FIG. 8 is a cross-sectional side view of the balustrade taken along line 8-8 of FIG. 7.

FIGS. 6-8 illustrate the first embodiment of the present invention used to attach a baluster 51 within a typical wood deck having the following components: deck planks 57 are attached to one or more structural joists 59; vertical support posts 53 extend upward from the deck planks 57; a fascia 56 is attached to the ends of the joists 59 and may further be attached to the lower ends of the support posts 53 to hide the joists 59 from view; a guard rail, or balustrade, is formed with an upper rail 55 and lower rail 52 attached between support posts 53 parallel to the deck planks 57, and a plurality of balusters 51 attached perpendicularly to the upper and lower rails 55, 52; a top plate 54 is attached to the support posts 53 and may further be attached at intervals to the upper rail 55. In a typical deck construction, the balusters 51 are attached with a rigid securement, typically one or two nails or screws driven through the baluster 51, to each rail 55, 52 on the face of the rails 55, 52 that faces away from the deck surface. As described above, the rigid securement prevents natural dimensional fluctuations and imparts tension forces on the baluster 51, the fasteners, and any attached components. The resulting failures of this construction include the drawing downward and bowing of the upper rail 55 from the top plate 54 between the support posts 53; and securement failure of the balusters 51, potentially leading to serious consequences in the event of a foreseeable user fall event. With the balusters 51 mounted on the outside of the deck surface, the failure of the lower baluster 51 securement will often not be noticed by the home or cabin owner, particularly in instances of high elevation decks.

The device 10 mitigates the above time-dependent baluster 51 failure, as the device 10 provides for vertical tension relief of the baluster 51 during foreseeable and anticipated baluster 51 shrinkage. The vertical tension relief also allows for minor baluster 51 expansion during periods of wetness for outdoor deck railings. With the upper end of the baluster 51 conventionally secured to the upper deck rail 55 by a rigid connection, such as by one or more securement screws 58, the device fits around the baluster 51 and is secured to the lower deck rail 52 using two wood screws 19 driven through the apertures 16 of the device 10 into the attachment surface of the lower deck rail 52. With a rigid attachment at the upper end and no rigid attachment at the lower end, the baluster 51 is allowed any amount of Slip movement resulting from dimensional fluctuations along its longitudinal axis, which in this embodiment is perpendicular to the ground. Further, the dimensions of the front, left, and right portions 11-13 are selected to leave a slight clearance gap 40 between the device 10 and the baluster 51 to allow longitudinal and radial movement of the baluster 51 while still horizontally securing the baluster 51 to prevent the baluster 51 from being kicked out by an impact force. The contained baluster 51 is thus allowed dimensional variation under conditions of contraction or expansion caused by commensurate wood moisture evaporation or absorption.

Figure 9:
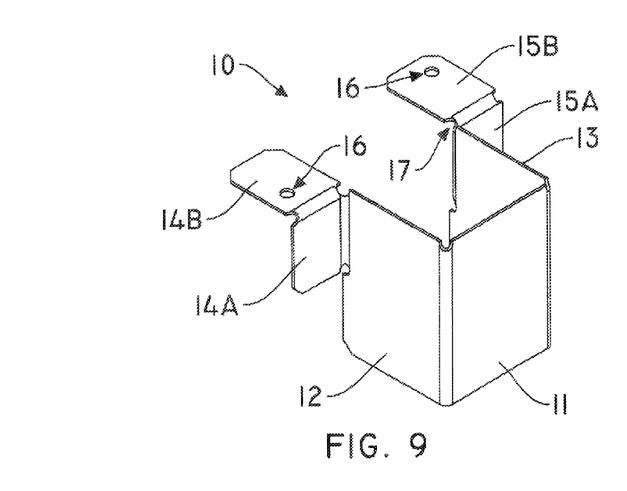
FIG. 9 is a top front left isometric view of a second embodiment of the present invention.
Figure 10:
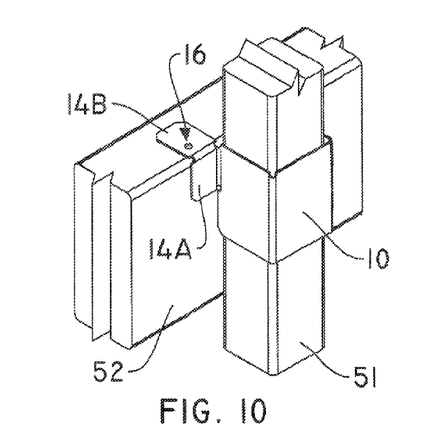
FIG. 10 is a top front left isometric view of the second embodiment of the present invention placed over a baluster and a lower deck rail.
Figure 11:
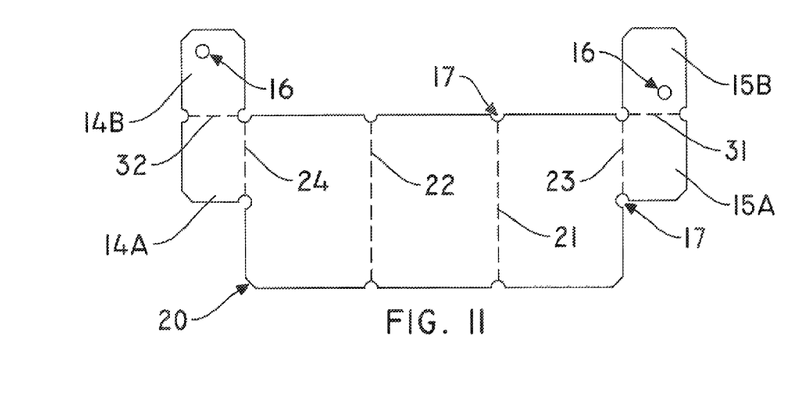
FIG. 11 is a diagram of a stamping pattern for fabricating the second embodiment of the present invention.

FIGS. 9-11 illustrate a second embodiment of the device 10, which may also be used to secure balusters 51 in a balustrade. The front portion 11 is attached to or integral with the left and right portions 12, 13 as in the first embodiment. The left and right tabs 14, 15 of the first embodiment are modified in the second embodiment to comprise a parallel section 14A, 15A and a perpendicular section 148, 158. The parallel sections 14A. 15A are attached to or integral with their corresponding portions 12, 13 at the rear edge of each portion 12, 13. The parallel sections 14A, 15A project laterally from their respective portions 12, 13 substantially parallel to the front portion 11. The parallel sections 14A, 15A are preferably coplanar so that the parallel sections 14A, 15A together contact the side of the second wood member. Preferably, the top edge of each parallel section 14A, 15A aligns with the top edge of its corresponding portion 12, 13. A perpendicular section 148, 158 is attached to or integral with each corresponding parallel section 14A, 15A and extends to the rearward aspect of the device 10 perpendicularly from the parallel section 14A, 15A.

One or more apertures may be disposed through each of the parallel sections 14A, 15A and perpendicular sections 14B, 15B. Preferably, one aperture 16 is disposed through each of the perpendicular sections 14B, 15B, allowing fasteners to be driven into the top of the second wood member. In this configuration, forces imparted on the screws by the baluster 51 will be shearing forces rather than tension forces. Typically, screws and nails are configured to withstand much greater forces in shear than in tension. Preferably, the position of each aperture 16 is offset with respect to the positions of the other apertures 16 reduce or prevent splitting of the second wood member as described above.

The illustrated second embodiment of the device 10 may be stamped out of sheet metal as shown in FIG. 11. Stress relief punches 17 may be formed at each juncture of the components to facilitate bending of the sheet into the proper device 10 configuration without imparting undue stress on the components. Preferably, the stamped metal is folded at 90 degree angles up out of the page at first and second up-fold lines 21, 22 and third and fourth up-fold lines 31, 32, and folded at 90 degree angles down into the page at first and second downfold lines 23, 24. Each bend requires a material bend allowance to maintain proper final dimensions after bending of the part is accomplished. Rear corners 20 of the right and left portions 12, 13 may be linearly cut or rounded to prevent damage or injury from the sharp corner.

Figure 12:
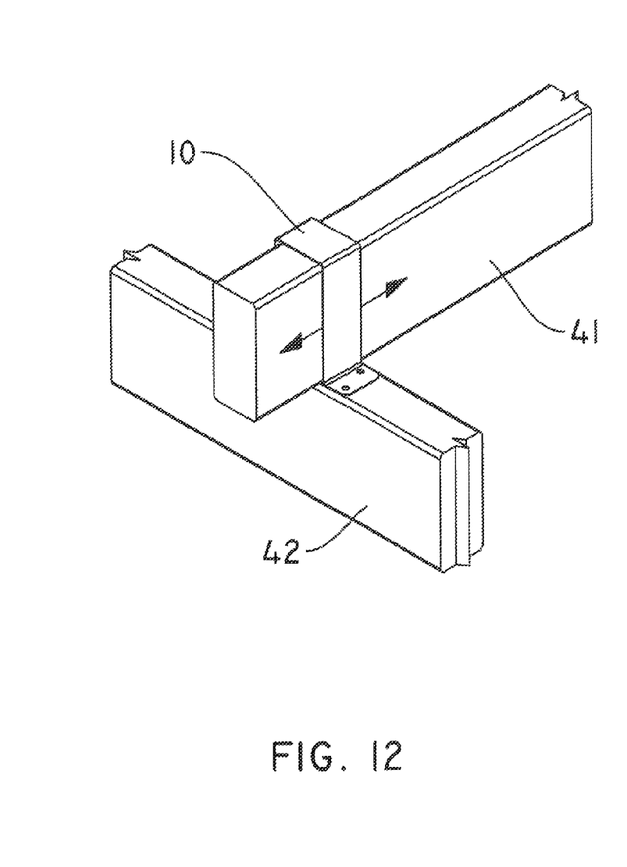
FIG. 12 is a top front right isometric view of a third embodiment of the present invention placed over a cross beam.
Figure 13:
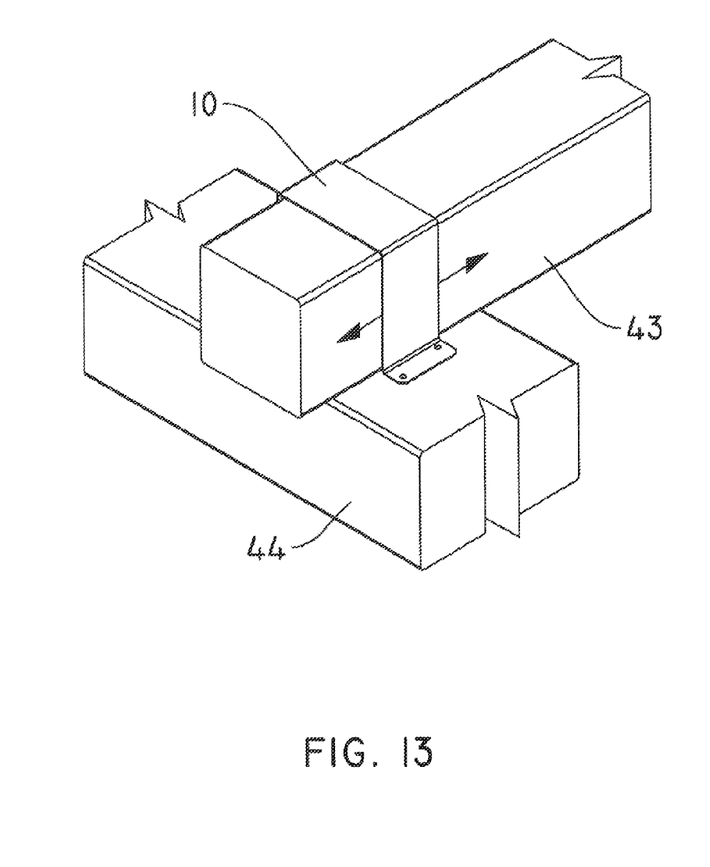
FIG. 13 is a top front right isometric view of a fourth embodiment of the present invention placed over a cross beam.

The inventive device 10 may be applied in any scenario where restricting the dimensional fluctuations of the first wood member is best avoided. FIG. 12 illustrates a third embodiment of the device 10 used to attach a rectangular first wood member, such as a wall stud or ceiling joist 41, to a second wood member, such as a floor plate or joist 42. In this embodiment, the axis of the first wood member, and therefore the axis of the device 10, is horizontal rather than vertical. Further, the dimension of the device 10 from front to rear aspect is longer to accommodate the additional width of the first wood member. In a fourth embodiment, illustrated in FIG. 13, the device 10 secures a larger square support beam 43 to a wide support beam 44.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. A method of attaching a first wood member to a second member so that the natural dimensional fluctuations of the first wood member are not restricted, the method comprising the following steps:
   placing a bracket around the first wood member such that the bracket is in contacting relationship with the second member and in non-contacting relationship with the first wood member, the bracket being a three-sided structure including:
      a planar front portion and planar left and right portions attached to opposing edges of the front portion and defining a proximal end and a distal end of the bracket that are each open, the left, front, and right portions leaving a clearance gap between the bracket and the first wood member; and
   at least two tabs, one of the tabs attached to the left portion of the bracket and another of the tabs attached to the right portion of the bracket, each of the tabs including a first section projecting from the respective left or right portion of the bracket and a second section projecting from and angularly transverse to the first section, wherein only the first section or the second section of each tab has at least one aperture disposed through the tab for receiving a fastener;
   abutting at least one of the tabs attached to the left portion and at least one of the tabs attached to the right portion against the second member such that the first section of each tab makes flush contact with the second member; and
   driving a fastener through each aperture into the second member, the fasteners securing the bracket to the second member such that the bracket remains in non-contacting relationship with the first wood member, the non-contacting relationship creating a clearance gap, thereby permitting natural dimensional fluctuations of the first wood member.

2. The method of claim 1 wherein the bracket extends around three sides of the first wood member.

3. The method of claim 1 wherein the bracket is substantially u-shaped.

4. The method of claim 1 wherein the bracket is stamped out of a single piece of sheet metal and bent into form.

5. The method of claim 1 wherein the first section of the tab attached to the left portion of the bracket is coplanar with the first section of the tab attached to the right portion of the bracket.

6. The method of claim 1 wherein the first wood member is a baluster.

7. The method of claim 6 wherein the baluster is rigidly attached at an end opposite the bracket to a third wood member.

8. The method of claim 1 wherein the natural dimensional fluctuations include allowing for longitudinal and radial expansion of the first wood member within the bracket.

* * * * *